United States Patent [19]

Pechko et al.

[11] 3,768,305
[45] Oct. 30, 1973

[54] INSTALLATION FOR TESTING PRESSURE TIGHTNESS OF CHECK VALVE CLOSING ELEMENT

[76] Inventors: Mikail Alexeevich Pechko, Kotelnicheskaya naberezhnaya, 1/15, kv. 353; Boris Yakovlevich Ivnitsky, 1 Granvoronovsky pereulok, 7, kv. 44; Eduard Evgenievich Blagov, Belyaevo-Bogorodskoe, kvartal 44, korpus 3, kv. 142; Ivan Grigorievich Filatov, Furmanovsky pereulok, 12, kv. 47, all of Moscow; Evgeny Ivanovich Ustinov, ulitsa Gagarina, 39, kv. 44, Chekhov, Moskovskaya oblasti; Sergei Iosifovich Rozhkov, ulitsa Gagarina, 26, kv. 13, Chekhov, Moskovskaya oblast; Viktor Konstantinovich Belov, Venjukovo, 1, Chekhov, Moskovskaya oblast; Nikolai Viktorovich Gruzdev, ulitsa Pervomalskay, 33, Chekhov, Moskovskaya oblast, all of U.S.S.R.

[22] Filed: Feb. 24, 1971

[21] Appl. No.: 118,310

[52] U.S. Cl. .................................... 73/45.5, 73/46
[51] Int. Cl. ............................................. G01m 3/08
[58] Field of Search ...................... 73/46, 47, 45.5

[56] References Cited
UNITED STATES PATENTS
1,554,637  9/1925  McKee ............................... 73/46 X
1,675,802  7/1928  Hamilton ........................... 73/46 X Primary Examiner—Richard C. Queisser
Assistant Examiner—Daniel M. Yasich
Attorney—Waters, Roditi, Schwartz & Nissen

[57] ABSTRACT

An installation for testing the pressure tightness of a closing element of a check valve, comprising a bath in which the valve can be immersed, and a mechanism for clamping the valve between fixed and movable sealing plugs at the end faces thereof. The fixed sealing plug has a channel to supply compresed testing gas into the valve, the other sealing plug having a channel for the discharge of leakage gas. The last mentioned plug is connected to a rod of a pneumatic cylinder and communicates with a source of compressed air. A fluid reservoir is located under the bath and is in communication therewith via a by-pass pipe which contains a float valve at its lower end.

4 Claims, 1 Drawing Figure

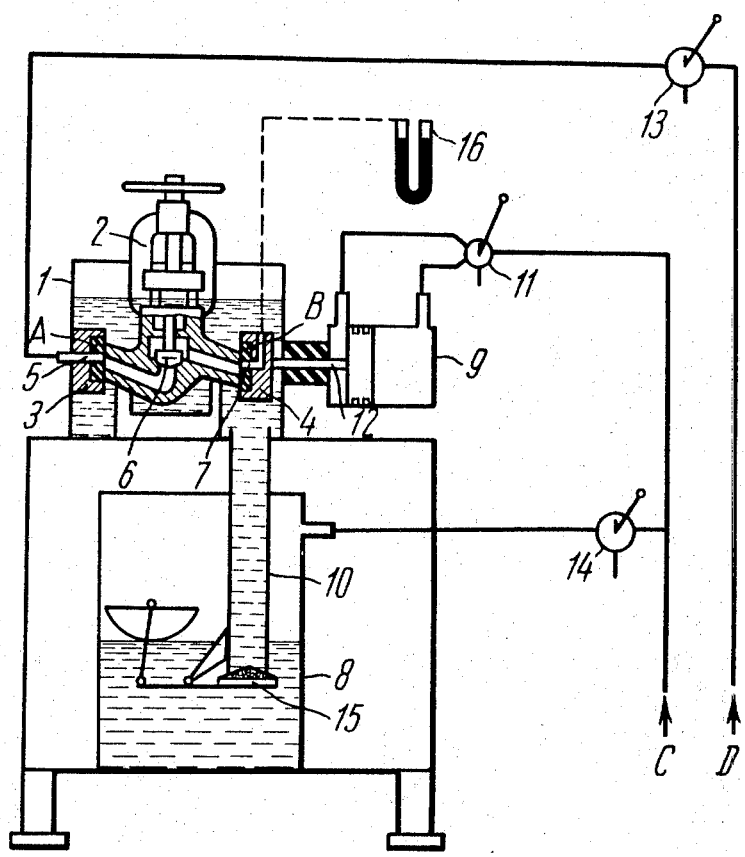

INSTALLATION FOR TESTING PRESSURE TIGHTNESS OF CHECK VALVE CLOSING ELEMENT

The present invention relates to apparatus for testing the pressure tightness of pipe fittings and more specifically it relates to apparatus for testing the pressure tightness of check valve closing elements.

The present invention can be utilized most efficiently for testing the pressure tightness of check valves intended for use at elevated pressures (higher than 100 kgf/cm$^2$) and temperatures (above 300° C) and in various media (steam, water, gas, etc.).

The known apparatus for testing the pressure tightness of closing elements of gas valves comprise a bath with a mechanism for clamping the valve at its ends by means of a fixed sealing plug and a movable sealing plug, one of which is provided with a channel for delivering the gaseous test fluid into the valve with its closing element closed while the other one has a channel for the discharge of the leaking fluid, and a fluid reservoir communicating with the bath into which the valve is immersed.

In these known installations the mechanism for clamping the valve has a membrane-type pneumatic drive of the straightway type. The bath is communicated with the fluid reservoir on the principle of communicating vessels.

In the course of the test, the water is forced out of the reservoir into the bath and the valve is clamped by the membrane drive with simultaneous passage through the drive of the gaseous test fluid to the closed closing element of the valve, by the force of compressed air delivered from a single source.

Connection of the bath with the reservoir on the principle of communicating vessels becomes possible due to the use of a comparatively low pressure (about 100–150 mm H$_2$O) which limits both the clamping force of the membrane drive and the pressure of the gaseous test fluid.

Practical experience has shown that testing the pressure tightness of the valve closing elements intended for use at high pressures and temperatures calls for test pressures of about 7–10 kgf/cm$^2$ and higher. In some cases, the test fluid may be not compressed air but some other gaseous fluid. Often it becomes necessary to test the pressure tightness of the closing elements of the valves of different type-sizes on one and the same installation.

The known installations are not adapted for tests of this kind. Moreover, it should be noted that constant presence of liquid in the bath causes some inconveniences in the use of this installation.

An object of the present invention resides in eliminating the aforesaid disadvantages.

The main object of the invention resides in providing an installation with such a valve clamping mechanism and such an arrangement of the bath and reservoir which allows the use of different gaseous test fluids for testing the tightness of the closing elements of various valve type-sizes and which also is simple and convenient in operation.

This object is accomplished by providing an installation for testing the pressure tightness of the check valve closing element in which, according to the invention, the clamping mechanism incorporates a pneumatic power cylinder connected to a source of compressed air which latter is also connected to a fluid reservoir, said reservoir being located under the bath and communicated with it through a bypass pipe one end of which is connected to the bath while its other end is immersed into the reservoir below the fluid level.

A favorable solution can be achieved if the end of the pipe located below the fluid level in the reservoir has a float valve for maintaining the preset fluid level in the bath throughout the test.

Due to such an arrangement, the present installation can be used for testing the pressure tightness of the check valves of various type-sizes with different gaseous test fluids.

The present invention will now be described in detail by way of example with reference to the sole figure of the accompanying drawing diagrammatically showing an installation for testing the pressure tightness of the check valve closing element.

The proposed installation for testing the pressure tightness of the check valve closing element comprises a bath 1 in which is immersed a valve 2 with a means A and B for clamping the valve at its ends with fixed and movable sealing plugs 3 and 4 respectively. The plug 3 has a channel 5 for feeding a gaseous test fluid into the valve 2 at one side of a closed closing element 6, while the plug 4 has a channel 7 for the discharge of any leaking fluid. The bath 1 communicates with a fluid reservoir 8.

According to the invention, the valve-clamping means incorporates a pneumatic power cylinder 9 connected to a source C of compressed air which is independent of a source D of the gaseous test fluid.

Separation of the sources C and D allows the employment of various gaseous media as a test fluid, e.g., air, nitrogen, ammonia, with test pressures above 7–20 kgf/cm$^2$. As a result, the installation of the invention can be used for testing the pressure tightness of the closing elements of the valves intended for use under high pressures (above 100 kgf/cm$^2$) and high temperatures (above 300° C).

Connected to the source C is the fluid reservoir 8 which is located under the bath 1 and communicates with it through a bypass pipe 10 one end of which is connected with the bath 1 while the other end is immersed into the reservoir 8 below the fluid level.

The present installation operates as follows.

The valve 2 under test with the closing element 6 closed is installed in the bath 1. By opening the cock 11 compressed air is passed from the source C into the pneumatic cylinder 9. The rod 12 of the pneumatic cylinder 9, connected with the movable sealing plug 4 presses the valve 2 against the fixed sealing plug 3, thus sealing off the valve at the end faces A and B.

A considerable travel of the rod 12 of the pneumatic cylinder 9 permits clamping valves of various types and sizes.

Then, by opening the cock 13, the gaseous test fluid is fed from the source D through the channel 5 in the fixed sealing plug 3 to the closed closing element 6 of the valve 2.

Now, the cock 14 is opened to admit compressed air from the source C into the fluid reservoir, thus forcing the fluid through the bypass pipe 10 into the bath 1 so as to cover the valve to a certain height. To prevent the fluid from flowing out of a bath 1, the preset level is maintained in it by means of the float valve 15 covering the end of the bypass pipe 10 which is below the fluid level in the reservoir 8.

The fluid level in the bath 1 can also be controlled by maintaining a certain pressure of air in the reservoir 8 with the aid of a reducing valve (not shown).

The absence of fluid in the bath 1 before the delivery of the gaseous test fluid to the closed closing element 6 of the valve 2 rules out the penetration of the fluid to the closing element 6 which improves the accuracy of the test since wetting of the closing element with fluid reduces sharply the probable leaks of the gaseous medium, thus distorting the results of the tests. Additionally, absence of the fluid in the bath facilitates lowering, clamping or removal of the valve and other work related to handling the installation.

On expiration of the preset time of holding the closing element under pressure, its pressure tightness is checked either visually, by watching for any leaks in the form of gas bubbles on the surface of the fluid in the bath from the channel of the movable sealing plug 4, or by measuring these leaks with the aid of corresponding measuring instruments 16 connected to the channel 7.

The present installation ensures conducting the tests for tightness of the check valves without damaging them or impairing their quality and appearance after manufacture. The valves that are found to be of good quality after the tests on the present installation can be regarded as a marketable product.

What is claimed is:

1. Apparatus for testing the pressure tightness of a closing element of a check valve, said apparatus comprising a container for receiving the check valve under test, means for clamping the valve at end faces thereof in the container and including a fixed sealing plug for engaging the valve at one end face, a movable sealing plug for engaging the valve at the other end face, and a pneumatic cylinder including a piston and piston rod, said piston rod being coupled to said movable plug, a source of compressed air, means for selectively connecting the pneumatic cylinder to the source of compressed air to clamp the valve to be tested between said plugs or to unclamp said valve, a source of gaseous test fluid, said fixed sealing plug having a channel connectible to the source of gaseous test fluid to receive the test fluid and pass the same into the valve, said movable plug having a channel connected to the valve to receive any test fluid leaking past the closing element of the valve, a liquid reservoir located under said container, a by-pass pipe connecting the reservoir and the container, said by-pass pipe having an upper end connected to said container and a lower end immersed into the liquid in the reservoir to permit liquid contained in the reservoir to flow to and from said container, means for selectively connecting said reservoir to said source of compressed air to cause liquid in the reservoir to be forced into the container and be maintained at a predetermined level so that testing of the check valve can be effected with the valve submerged in said liquid, the connection of said sources to the pneumatic cylinder, the reservoir and the channel of the fixed sealing plug being selectively controlled for permitting the valve to be clamped in the container without the presence of liquid therein and to introduce liquid into the container after the valve is clamped in place.

2. Apparatus as claimed in claim 1 comprising a float valve at the lower end of said by-pass pipe for maintaining a preset level of liquid in the container throughout the test.

3. Apparatus as claimed in claim 1 comprising means connected to said channel in the movable plug for measuring any leakage of test fluid.

4. Apparatus as claimed in claim 1 wherein said source of compressed air and said source of gaseous test fluid are separately connected to the both of said selective connecting means and to the fixed plug, respectively.

* * * * *